B. BORDEN.
PIPE THREADING TOOL.
APPLICATION FILED SEPT. 30, 1910.
1,062,218.   Patented May 20, 1913.
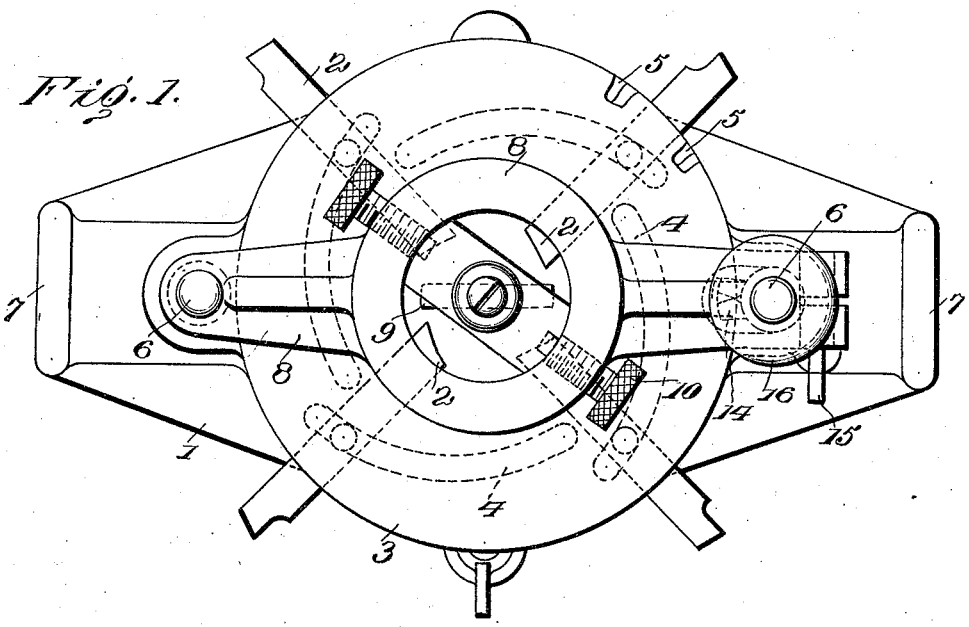
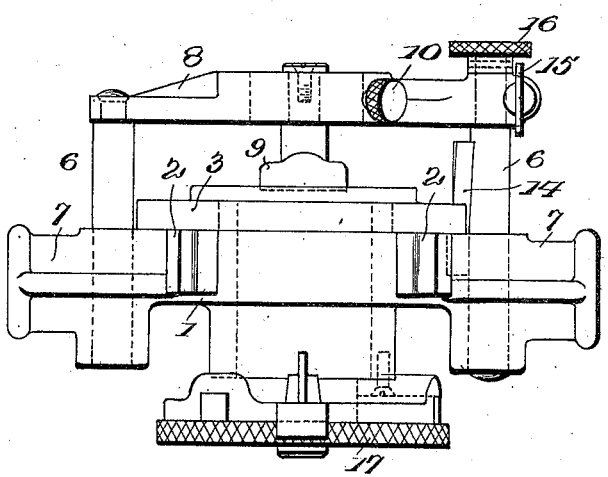
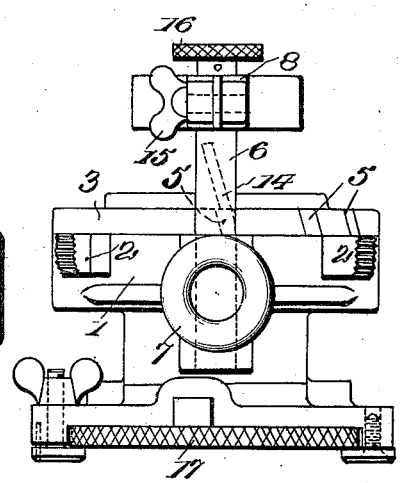
Witnesses
W. A. Williams.
Inventor
Bradford Borden.
By
Attorney

UNITED STATES PATENT OFFICE.

BRADFORD BORDEN, OF TORONTO, ONTARIO, CANADA, ASSIGNOR TO THE BORDEN COMPANY, OF WARREN, OHIO, A CORPORATION OF OHIO.

PIPE-THREADING TOOL.

1,062,218.     Specification of Letters Patent.     Patented May 20, 1913.

Application filed September 30, 1910. Serial No. 584,735.

*To all whom it may concern:*

Be it known that I, BRADFORD BORDEN, a resident of Toronto, in the Province of Ontario and Dominion of Canada, have invented certain new and useful Improvements in Pipe-Threading Tools; and I do hereby declare the following to be a full, clear, and exact description of the invention, such as will enable others skilled in the art to which it appertains to make and use the same.

This invention relates to that class of diestocks or pipe threading tools for cutting tapered threads and capable of being used without the employment of a work-holder clamped to the pipe, or other object, and in respect to which the chaser-carrier has a rotary and longitudinal movement.

The primary object of the present invention is to provide improved means for controlling the rotation of the chaser-engaging plate independently of its rotation with the chaser-carrier, and which means will permit of a ready and easy adjustment of the chasers for pipes of different sizes, and also for under and over cutting.

A further object is to enable the same tool to be readily employed for cutting straight as well as tapered threads.

The invention will be hereinafter fully set forth and particularly pointed out in the claims.

In the accompanying drawings, Figure 1. is an end elevation. Fig. 2. is a side elevation. Fig. 3 is a view at right angles to Fig. 2.

Referring to the drawings, 1 designates the chaser-carrier or housing which is provided with a series of radially arranged guideways to accommodate chasers 2. I have shown each of the latter threaded on both ends, but this is not new.

3 is the chaser-engaging or cam plate which extends over the face of the chaser-carrier and has means for engaging the chasers, such as eccentrically arranged grooves 4 (see dotted lines Fig. 1) for taking in pins projecting from the chasers. This cam plate is shown as provided in its periphery with three grooves or cut-outs 5, but the number of such cut-outs is regulated by the capacity of the tool.

6 designates two posts which are passed through openings in the chaser-carrier at right angles to the handle sockets 7. These posts are connected together by a cross member 8 which is arranged perpendicularly to the axis of the tool and which at its center carries a stop 9 for engaging the end of the pipe or other object so as to prevent the posts from partaking of the longitudinal movement of the carrier during the threading operation. This stop is held by screws 10 in a central ring-like portion of cross member 8, so that, when the stop is removed, the tool may be used for cutting straight threads, the end of the pipe being free to pass through said ring-like portion.

One of the posts 6 carries a diagonally-arranged lug 14 for fitting in any one of the cut-outs 5 and thereby control the rotation of the cam plate independently of its rotation with the chaser-carrier. To enable the chasers to be set for under or over cutting from standard, and to permit the lug to be disengaged from the cam plate so that the latter may be turned to adjust the chasers to pipes of different sizes, the lug-carrying post is capable of being turned axially. For this purpose, the end of the cross member 8 is split and clamped by screw 15, by loosening which the lug-carrying post may be turned by grasping its milled-head 16, and thereby adjust the cam plate and chasers. Of course, by pulling outwardly on the cross member to disengage the lug from the cam plate, the latter may be manually turned to adjust the chasers.

At 17 I have shown a centering device for properly alining the tool on the pipe to be threaded, but this device does not bind on the pipe in the sense of a work-holder.

In practice, the stock is turned axially, and as the chaser-carrier travels longitudinally of the pipe, the lug-carrying post is (as is also the other post) prevented from partaking of such longitudinal movement by the engagement of stop 9 with the pipe. As the chaser-carrier is rotated the cam plate will, by reason of its engagement with the diagonally-arranged lug, be controlled in its rotation independently of its rotation with the chaser-carrier, and thereby the recession of the chasers is automatically controlled. Adjustment for under or over cutting from standard, and for changing from one size to another is quickly accomplished by axially turning the lug-carrying post.

It is to be understood that the carrying out of my invention is not dependent upon any one specific form of mechanism, and that changes may be made without departing from the spirit of the invention.

In this tool the rotation of the chaser-engaging plate, independently of its rotation with the chaser-carrier, is brought about by the engagement of the end of the pipe with the stop, which engagement prevents the cross member and posts from partaking of the longitudinal travel of the chaser-carrier during which latter travel the independent rotation of the plate is controlled.

I claim as my invention:—

1. In combination with a rotatable and longitudinally movable chaser-carrier, a series of radially arranged chasers, and a cam plate mounted on said chaser-carrier for engaging the chasers, a post having a diagonally arranged portion for interlocking with the cam plate for controlling the axial turning thereof independently of its rotation with the chaser-carrier, a member carrying said post, and an element mounted on said member for engaging the article being threaded to prevent the post from partaking of the longitudinal travel of the chaser-carrier, and means connecting said post to said member for permitting the post to be turned axially to disengage its diagonally arranged portion from the cam plate to permit the latter to be turned independently of the post.

2. In combination with a rotatable and longitudinally movable chaser-carrier, a series of radially arranged chasers, and a cam plate mounted on said chaser-carrier for engaging the chasers, said cam plate having a plurality of spaced-apart cut-outs in its periphery, a post having a diagonally arranged lug for entering any one of said cut-outs, said post being rotatable with said chaser-carrier but not partaking of its longitudinal movement, and means for permitting said post to be turned on its axis to disengage its lug from a cut-out in said cam plate to allow the latter to be turned independently of the post.

3. In combination with a rotatable and longitudinally movable chaser-carrier, a series of radially arranged chasers, and a cam plate mounted on said chaser-carrier for engaging the chasers, said cam plate having one or more cut-outs in its periphery, two oppositely disposed posts, one of said posts having a diagonally arranged portion for engaging the cut-outs of the cam plate to effect the axial turning thereof independently of its rotation with the chaser-carrier, a cross member carrying said posts, an element mounted on said cross member for engaging the article being threaded to prevent the posts from partaking of the longitudinal travel of the chaser-carrier, and means for permitting the post carrying the lug to be turned axially to disengage said lug from a cut-out in said cam plate to allow the latter to be turned independently of the post.

4. In combination with a rotatable and longitudinally movable chaser-carrier, a series of radially arranged chasers, and a cam plate mounted on said chaser-carrier for engaging the chasers, said cam plate having one or more cut-outs in its periphery, a post having a diagonally arranged portion for engaging the cut-outs of the cam plate, a cross member split at one end, a clamping screw therefor, said post being held in said split end, an element for permitting the post carrying the lug to be turned axially to disengage its lug from a cut-out in said cam plate to allow the latter to be turned independently of the post.

5. In combination with a rotatable and longitudinally movable chaser-carrier, a series of radially arranged chasers, and a cam plate mounted on said chaser-carrier for engaging the chasers, said cam plate having one or more cut-outs in its periphery, a post having a diagonally arranged lug for entering any one of said cut-outs, said post being rotatable with said chaser-carrier but not partaking of its longitudinal movement, a cross-member having a central opening, said post being connected to said cross-member, and a stop removably held to said cross-member, in line with said central opening, said stop being designed to be removed when it is desired to cut a straight thread, and said central opening in the cross member being of sufficient diameter to allow of the passage of a pipe.

6. In combination with a rotatable and longitudinally movable chaser-carrier, a series of radially arranged chasers, and a cam plate mounted on said chaser-carrier for engaging the chasers, a post having a diagonally arranged portion interlocking with the cam plate, said post being rotatable with said chaser-carrier but not partaking of its longitudinal movement, a cross-member having a central opening, said post being connected to said cross-member, and a stop, removably held to said cross-member, in line with said central opening, said stop being designed to be removed when it is desired to cut a straight thread, and said central opening in the cross-member being of sufficient diameter to allow of the passage of a pipe.

In testimony whereof, I have signed this specification in the presence of two subscribing witnesses.

BRADFORD BORDEN.

Witnesses:
  H. R. SULLIVAN,
  J. NOTA MCGILL.

Copies of this patent may be obtained for five cents each, by addressing the "Commissioner of Patents, Washington, D. C."